United States Patent [19]

Brosig

[11] Patent Number: 5,188,870
[45] Date of Patent: Feb. 23, 1993

[54] HIGH-RESOLUTION, PASSIVELY CONTROLLED LIQUID CRYSTAL DISPLAY

[75] Inventor: Stefan Brosig, Stuttgart, Fed. Rep. of Germany

[73] Assignee: Nokia (Deutschland) GmbH, Fed. Rep. of Germany

[21] Appl. No.: 702,059

[22] Filed: May 17, 1991

[30] Foreign Application Priority Data

May 17, 1990 [DE] Fed. Rep. of Germany ....... 4015869

[51] Int. Cl.$^5$ .......................................... G02F 1/1337
[52] U.S. Cl. ........................................ 428/1; 359/75; 359/78; 428/422
[58] Field of Search ................. 359/75, 78, 77; 428/1, 428/422

[56] References Cited

U.S. PATENT DOCUMENTS

| | | | |
|---|---|---|---|
| 3,864,021 | 2/1975 | Katagiri et al. | 428/1 |
| 3,867,015 | 2/1975 | Iida et al. | 350/160 |
| 3,910,682 | 10/1975 | Arai et al. | 350/160 |
| 4,004,848 | 1/1977 | Yamazaki | 428/1 |
| 4,038,439 | 7/1977 | Gibson et al. | 427/38 |
| 4,370,028 | 1/1983 | Biernhardt | 350/341 |
| 4,472,027 | 9/1984 | Okubo et al. | 350/340 |
| 4,514,043 | 4/1985 | Ahne et al. | 350/341 |
| 4,779,957 | 10/1988 | Suginoya et al. | 350/339 |
| 4,818,075 | 4/1989 | Takao et al. | 350/339 |

FOREIGN PATENT DOCUMENTS

| | | |
|---|---|---|
| 0032397 | 7/1981 | European Pat. Off. . |
| 2311526 | 9/1973 | Fed. Rep. of Germany . |
| 2325998 | 12/1973 | Fed. Rep. of Germany . |
| 2336178 | 1/1974 | Fed. Rep. of Germany . |
| 2340853 | 2/1975 | Fed. Rep. of Germany . |
| 2740384 | 3/1978 | Fed. Rep. of Germany . |
| 2931259 | 2/1981 | Fed. Rep. of Germany . |
| 3150830 | 7/1982 | Fed. Rep. of Germany . |
| 3107520 | 9/1982 | Fed. Rep. of Germany . |
| 0363908 | 10/1989 | Fed. Rep. of Germany . |
| 52-7757 | 1/1977 | Japan . |
| 52-20048 | 2/1977 | Japan . |
| 52-1148153 | 12/1977 | Japan . |

OTHER PUBLICATIONS

Japanese Abstract, vol. 11, No. 256, Aug. 20, 1987 JP-A-62 062 332-oriented substract for liquid crystal display.
IBM Technical Bulletin, vol. 16, No. 9, Feb. 1974-Fluocarbon Surface Aligning Agents for Nematic Liquids R. F. Bush, I. Naller & H. A. Huggins.
Jacques Cognard—"Alignment of Nematic Liquid Crystals and their Mixtures", Supplement 1, Dec. 1982. Gordon and Breach Science Publishers, Inc., New York S.

Primary Examiner—Alexander S. Thomas
Attorney, Agent, or Firm—Ware, Fressola, Van Der Sluys & Adolphson

[57] ABSTRACT

With a view to improving the resolution of passively controlled liquid crystal displays, the invention proposes that at least the orientation layer (14.1, 14.2) of one of the two substrate plates (3,4) of the liquid crystal display should be made up of a highly fluorated and preferably perfluorated, aliphatic polymer, which could be, among others, Teflon AF 1600 marketed by the Dupont Company.

An orientation layer formed in accordance with the invention also makes it possible for organic dyestuffs to be used as the chromophore layer, because an orientation layer in accordance with the invention only requires heat treatment temperatures not exceeding 250° C. The pretilt angles obtained by means of the orientation layers in accordance with the invention can be set during the manufacturing process and lie in the range between 25° and about 90°.

5 Claims, 1 Drawing Sheet

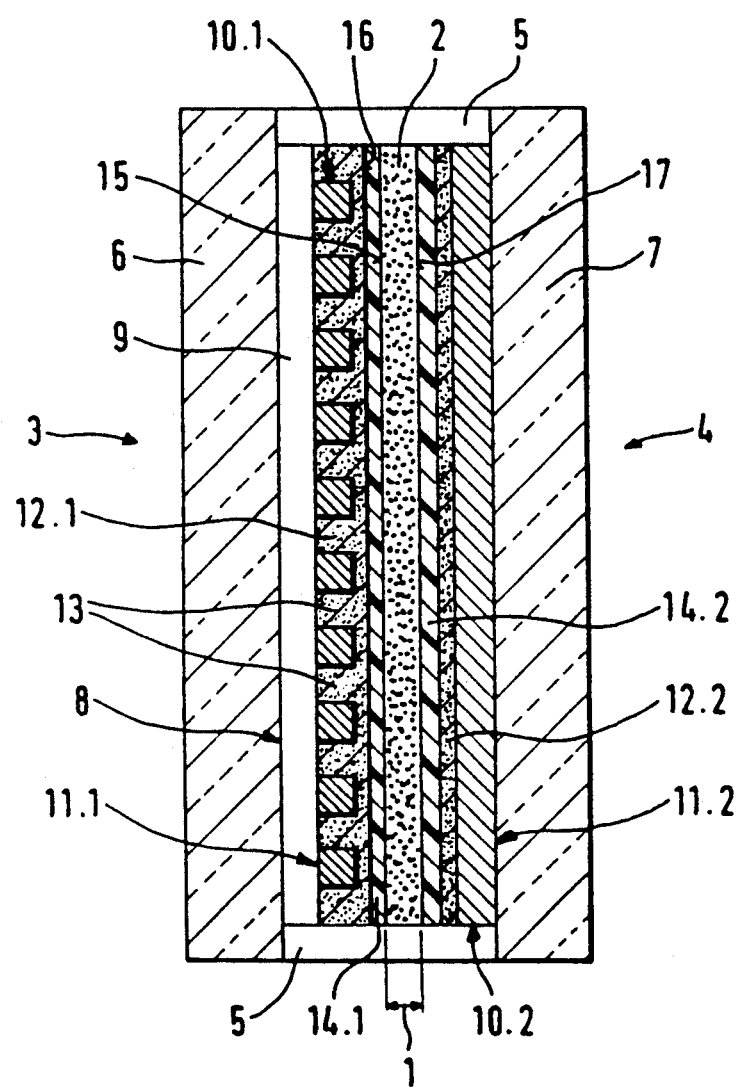

HIGH-RESOLUTION, PASSIVELY CONTROLLED LIQUID CRYSTAL DISPLAY

BACKGROUND OF THE INVENTION

1. Field of the Invention

The present invention concerns passively controlled liquid crystal displays wherein the orientation layer arranged on the substrate plates impresses a large pretilt angle, as well as a method of producing such liquid crystal displays.

2. Description of the Prior Art

Liquid crystal displays have been known for some time in the state of the art. They have the common feature of consisting of two transparent plates that run parallel to each other and at a given distance between them, as well as of a frame that rigidly joins these plates, the space delimited by the frame and the two plates being filled with liquid crystal. Especially in high-quality liquid crystal displays suitable for use in television sets, the two plates will be made of glass. The plate surfaces facing each other are coated with a variety of different materials.

Thus, in the case of monochromatic liquid crystal displays, where the two plate surfaces facing each other are provided with the same sequence of coatings, it is known first to provide the said plate surfaces with a transparent and structured electrode array, possibly as an ITO arrangement. This electrode layer is followed by an equalization and insulation layer, which may be a layer of silicon dioxide for example. The equalization and insulation layer carries the socalled orientation layer. This orientation layer, which is in direct contact with the liquid crystal, is traditionally made of polyimides or polyphenyls. With a view to improving the orientation of the liquid crystal molecules immediately adjacent to the orientation layer, the surface of the orientation layer facing the liquid crystal can also be oriented by means of mechanical processes.

When the liquid crystal display is to be capable of reproducing colors, one of the two substrate plates, preferably the substrate plate on which the reproduction of—say—the television image is subsequently to be obtained, will be provided with an additional layer between the surface of the glass plate facing the liquid crystal and the electrode layer. This layer, which contains the organic dyestuffs, will henceforth be referred to as the chromophore layer.

High-resolution, passively controlled liquid crystal displays, which have a wide angle of view and have to be highly multiplexed, call for orientation layers that impress a large angle of incidence, the socalled pretilt angle, upon the liquid crystal molecules.

Orientation layers having the required properties can be produced by means of oblique vacuum deposition of silicon dioxide on the substrate plate. Very large pretilt angles can be set when this technique is employed. A disadvantageous feature is however constituted by the fact that this method is very costly and, what is more, can be used only with very small substrate plates. When larger substrate plates have to be produced with a pretilt angle up to about 25°, it is known that organic orientation layers, possibly a polyphenyl layer, can be applied to the formation of a polyphenyl layer on a substrate plate calls for tempering conditions of the order of 400° C. and all known dyestuffs from which a given chromophore layer could be formed will change their previously stable color above a temperature of about 240° C. to 250° C., intensive efforts were subsequently made—bearing in mind that the chromophore layer is arranged between the surface of the glass plate and the electrode layer and that it must therefore quite inevitably be heated to about 400° C. when the orientation layer is formed—to lower the tempering temperatures to a value that would not damage the chromophore layers. This requirement was satisfied by the development of the socalled low-temperature polyimides and low-temperature polyphenyls, which only call for a tempering temperature of the order of 160° C. to 260° C. Although the liquid crystal displays produced by employing these substances are already characterized by good color reproduction properties, further investigations have shown that orientation layers formed with low-temperature polyimides and/or low-temperature polyphenyls have pretilt angles of up to 8° at the very most. Attempts to combine a substrate plate devoid of a chromophore layer but provided with a high-tilt orientation layer tempered at a temperature of about 400° C. with a substrate plate having an orientation layer made up of low-temperature polyimides have shown that the total tilt that can be obtained between the two substrate plates rises above the individual tilt in the orientation layer constituted by the low-temperature polyimides. But even the total tilt of these combined substrate plates, which is not equal to the arithmetic mean of the individual tilts but merely approximates the individual tilt of the orientation layer having the larger coupling energy, is not yet sufficient for high-resolution liquid crystal displays. The present invention involves a liquid crystal display, and more particularly an orientation layer, that can be easily produced and will impress a large pretilt angle upon the liquid crystal molecules, as well as a method of producing an orientation layer that will guarantee a large pretilt angle.

SUMMARY OF THE INVENTION

As far as the device itself is concerned, this problem is solved by providing at least one of the two substrate plates with an orientation layer made up of a highly fluorated and preferably perfluorated polymer.

The provision on substrate plates of orientation layers in accordance with the present invention is also particularly advantageous in that it leads to a considerable improvement of the degree of blackening of the liquid crystal display in the switched state. When a substrate plate provided with a polyphenyl layer tempered at 400° C. as the orientation layer is combined with a substrate plate in accordance with the present invention, the magnitude of the total tilt between the two substrate plates is decisively affected by the individual tilt of the substrate plate of traditional design. This is true quite independently of whether the individual tilt of the substrate plate of traditional design is greater or smaller than the individual tilt of the substrate plate in accordance with the present invention.

This is particularly advantageous because the combination of substrate plates of traditional design with substrate plates in accordance with the present invention makes it possible to accurately set practically any desired total tilt.

It is believed this feature of the highly fluorated aliphatic polymer as used in the present invention arises from the fact that this material is distinguished by an extremely low surface energy. Moreover, the low surface energy of this material is also directly connected with the enhanced degree of blackening of a liquid crystal display with an orientation layer in accordance with the present invention, because the lesser coupling to the surface already ensures a weak field and a fully homoeotopic orientation.

The present invention also provides a method of producing an orientation layer made up of highly fluorated aliphatic polymers. The special reference to the amorphous fluoropolymer material known as TEFLON AF 1600 is only intended by way of example, and the method can be used especially with any soluble, highly fluorated aliphatic polymer.

When the amorphous fluoropolymer, TEFLON AF 1600 of the Dupont Company is used as the highly fluorated aliphatic polymer, one enjoys the advantage that this material calls only for heat treatment temperatures up to about 250° C., even though it ensures an angle of incidence of the liquid crystal molecules with respect to the surface of this orientation layer of more than 25°.

When one of the two substrate plates is also provided with a chromophore layer and this substrate plate with the chromophore layer is then provided with an orientation layer in accordance with the present invention, this brings the advantage that, over and above the large pretilt angle on this orientation layer, it is also possible to use known dyestuffs for forming the chromophore layer. This is due to the fact that the highly fluorated aliphatic polymer used for forming the orientation layer can make do with heat treatment temperatures lying below 260° C., the precise temperature depending on the nature of the polymer.

The steps of the present invention are such as to exert a decisive influence on the magnitude of the pretilt angle during the manufacturing process for producing an orientation layer in accordance with the present invention. When the solution applied to the substrate plate is first thoroughly dried and then subjected to the heat treatment needed for the production of an orientation layer in accordance with the present invention, the heat treatment temperature acting on the substrate plate can be used to very accurately set the pretilt angle of the orientation layer. Temperatures close to the 250° C. limit will lead to comparatively small pretilt angles, while lower temperatures will produce pretilt angles up to 90°.

DESCRIPTION OF THE DRAWING

The invention will now be discussed in greater detail by reference to a figure. This figure shows a section through a liquid crystal display in side elevation.

DETAILED DESCRIPTION OF THE PREFERRED EMBODIMENT

The space 1, which is filled with liquid crystal 2, is formed by a first substrate plate 3, a second substrate plate 4 and a frame 5, the substrate plates 3, 4 and the said frame 5 being rigidly glued to each other and in such a way as to exclude the entry of air.

These substrate plates 3, 4, which run parallel to each other at a given distance between them, consist in each case of a base plate 6, 7 made of glass that on the side facing the liquid crystal 2 carries a series of coatings placed on top of each other. The layer in direct contact with the surface 8 of the glass plate 6 is the socalled chromophore layer 9. This layer is immediately followed by the electrode layer 10.1, while the electrode layer 10.2 of the substrate plate 4 is in direct contact with the glass plate 7. In the example here illustrated/-the two electrode layers 10.1, 10.2 are formed as structured ITO layers and each of them is provided with a large number of separate conductor strips 11.1, 11.2. The conductor strips 11.1, 11.2 of the electrode layers 10.1, 10.2 are turned through 90° with respect to each other, their arrangement being such that the conductors 11.1 of the electrode layer 10.1 run along the direction in which the figure is viewed, while the conductor strips 11.2 of the electrode layer 10.2 run in the direction of the paper on which it is printed.

The surfaces of the electrode layers 10.1, 10.2 that face each other are in each case covered by an equalization and insulation layer 12.1, 12.2, the layer—as can be clearly seen in the case of the substrate plate 3—equalizing also the interstices 13 between the conductor strips 11.1 and 11.2 (though in the latter case this cannot actually be seen from the figure). In the illustrated embodiment, the equalization and insulation layer 12.1, 12.2 is a layer of silicon dioxide.

The equalization and insulation layer 12.2 of the substrate plate 4 is followed by an orientation layer 14.2 of the traditional and known polyphenyl type. The pretilt angle that is formed between the surface 17 of the orientation layer 14.2 and the liquid crystal 2 amounts to about 20°.

In another embodiment that is not shown here, though it is similar to the embodiment as discussed, the orientation layer 14.2 of the substrate plate 4, i.e. the plate without a chromophore layer, can also consist of a highly fluorated, aliphatic polymer. The special properties of this material as a material for the orientation layers of liquid crystal cells will be discussed in some detail at a later stage.

The equalization and insulation layer 12.1 of the substrate plate 3, which is the substrate plate provided with the chromophore layer 9, is also covered by an orientation layer 14.1. The material making up the orientation layer 14.1 is a highly fluorated, aliphatic polymer and can be obtained under the commercial designation TEFLON AF 1600 (an amorphous fluoropolymer) from the Dupont Co. According to data supplied by the manufacturer, this transparent material has a vitrification temperature of 140° C. to 160° C. and a melting point of 240° C. to 275° C.

In the embodiment here described, the orientation layer 14.1 was produced by first dissolving the TEFLON AF 1600 in perfluorated fluorocarbon. When this is done, the proportion of TEFLON AF 1600 in the solution should not exceed five percent in order to maintain the viscosity within proper limits. Subsequently, the solution was applied to the surface 16 of the equalization and insulation layer 12.1 and, after being allowed to act on the surface 16 for a period of 30 seconds, was subjected to centrifuging at 1000 r.p.m. for a further 30 seconds. Following thorough drying, the orientation layer 14.1 was then heat treated at 250° C. for a period of 30 minutes. The pretilt angle of the orientation layer produced in this manner amounts to about 35° in the transition area between the surface 15 of the orientation layer 14.1 and the liquid crystal 2, while—given the small surface energy of the orientation layer 14.1—the total tilt prevailing between the orientation layers 14.1 and 14.2 amounts to nearly 25°.

Attention is drawn to the fact that the pretilt angle of every orientation layer made of a highly fluorated, aliphatic polymer (in the embodiment here described only the orientation layer 14.1) depends on the concentration of the highly fluorated, aliphatic polymer and the solvent. The val stated hereinabove relate to a 1% solution of TEFLON AF 1600 in a solvent marketed by the 3M Company under the commercial designation Fluorinert FC 77.

The surfaces 15, 16 of the orientation layers 14.1, 14.2, i.e. the surfaces facing the liquid crystal 2, are oriented by means of traditional methods.

It should also be noted that orientation layers made of highly fluorated, aliphatic polymers are not limited to liquid crystal displays suitable for color reproduction. When monochromatic liquid crystal displays are to be provided with an orientation layer in accordance with the present invention, a sufficiently large total tilt between the substrate plates may already be obtained when only one of the two substrate plates is provided with the orientation layer made up of a highly fluorated, aliphatic polymer.

What is claimed is:

1. A high-resolution, passively controlled liquid crystal display comprising:
   - a first substrate plate (3) made of glass and coated on one side with a transparent and structured electrode (10.1), an equalization and insulation layer (12.1) and a mechanically oriented orientation layer (14.1);
   - a second substrate plate (4) made of glass and coated on one side with a transparent and structured electrode (10.2), an equalization and insulation layer (12.2) and a mechanically oriented orientation layer (14.2); and
   - a frame (5) joining the two substrate plates (3,4) along their coated surfaces in such a way as to prevent the entry of air; and a liquid crystal (2) contained in the space (1) formed by the two substrate plates (3,4) and the frame (5),
   wherein the orientation layer (14.1, 14.2) of at least one of the two substrate plates (3,4) is made of a transparent, highly fluorated, soluble amorphous, aliphatic polymer.

2. A liquid crystal display in accordance with claim 1, wherein the highly fluorated, soluble, amorphous, aliphatic polymer is a material marketed by the DuPont Company under the commercial designation TEFLON AF 1600.

3. A liquid crystal display in accordance with claim 2, wherein one of the substrate plates (3,4) comprises a chromophore layer (9) between the surface (8) of the glass plate (6) and the electrode layer (10.1), the chromophore layer being made up of organic materials, and the substrate plate (3) provided with the chromophore layer (9) is always the substrate plate that is provided with an orientation layer (14.1) that is made up of the highly fluorated, soluble, amorphous, aliphatic polymer.

4. A liquid crystal display in accordance with claim 1, wherein one of the substrate plates (3,4) comprises a chromophore layer (9) between the surface (8) of the glass plate (6) and the electrode layer (10.1), the chromophore layer being made up of organic materials, and the substrate plate (3) provided with the chromophore layer (9) is always the substrate plate that is provided with an orientation layer (14.1) that is made up of the highly fluorated, soluble, amorphous, aliphatic polymer.

5. A liquid crystal display in accordance with claim 1, wherein the highly fluorated, soluble, amorphous, aliphatic polymer is a perfluorated aliphatic polymer.

* * * * *